(12) United States Patent
Yui et al.

(10) Patent No.: US 11,063,259 B2
(45) Date of Patent: Jul. 13, 2021

(54) CATHODE ACTIVE MATERIAL FOR LITHIUM ION BATTERY, AND LITHIUM ION BATTERY

(71) Applicant: TOYOTA JIDOSHA KABUSHIKI KAISHA, Toyota (JP)

(72) Inventors: Yuhki Yui, Susono (JP); Yoshinari Makimura, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/435,810

(22) Filed: Jun. 10, 2019

(65) Prior Publication Data

US 2020/0044252 A1 Feb. 6, 2020

(30) Foreign Application Priority Data

Jul. 31, 2018 (JP) .............................. JP2018-144321

(51) Int. Cl.
  *H01M 4/00* (2006.01)
  *H01M 4/525* (2010.01)
  *H01M 10/0525* (2010.01)
  *H01M 4/505* (2010.01)
  *C01G 51/00* (2006.01)
  *H01M 4/02* (2006.01)

(52) U.S. Cl.
  CPC .......... *H01M 4/525* (2013.01); *C01G 51/006* (2013.01); *H01M 4/505* (2013.01); *H01M 10/0525* (2013.01); *C01P 2002/32* (2013.01); *C01P 2002/72* (2013.01); *C01P 2006/40* (2013.01); *H01M 2004/028* (2013.01)

(58) Field of Classification Search
  CPC .......... H01M 2004/028; H01M 4/525; H01M 4/505; C01P 2002/32; C01P 2006/40; C01G 51/42
  See application file for complete search history.

(56) References Cited

U.S. PATENT DOCUMENTS

| 2010/0297504 A1 | 11/2010 | Oki et al. | |
| 2016/0133929 A1* | 5/2016 | Hah | H01M 4/364 429/220 |
| 2018/0079655 A1* | 3/2018 | Dai | C01G 53/50 |

FOREIGN PATENT DOCUMENTS

| JP | 2002-289175 A | 10/2002 |
| JP | 2011-001256 A | 1/2011 |
| JP | 2016-143539 A | 8/2016 |

OTHER PUBLICATIONS

Eungje Lee, et al., "Exploring Lithium-Cobalt-Nickel Oxide Spinel Electrodes for ≥3.5 V Li-Ion Cells", Applied Materials & Interfaces, American Chemical Society, 2016, pp. 27720-27729.

* cited by examiner

*Primary Examiner* — Cynthia H Kelly
*Assistant Examiner* — Monique M Wills
(74) *Attorney, Agent, or Firm* — Sughrue Mion, PLLC (57) ABSTRACT

When spinel-type lithiated cobalt oxide is employed for a cathode active material for a lithium ion battery, a sufficient discharge capacity is not always obtained. Thus, spinel-type lithiated cobalt oxide is doped with at least chromium, and specifically, a cathode active material for a lithium ion battery includes a spinel-type crystal phase including lithium, cobalt, chromium and oxygen, and the cathode active material has a composition represented by $LiCo_xCr_yM_zO_{2\pm\delta}$ where M is at least one selected from Al and Mn, and $0.85 \leq x < 1$, $0 < y \leq 0.15$, $0 \leq z$, and $0.85 < x+y+z \leq 1.2$.

3 Claims, 6 Drawing Sheets

CATHODE ACTIVE MATERIAL FOR LITHIUM ION BATTERY, AND LITHIUM ION BATTERY

FIELD

The present application discloses, for example, a cathode active material to be used in a lithium ion battery.

BACKGROUND

As disclosed in Patent Literatures 1 to 3, lithium cobalt oxide having a layered rock-salt crystal phase, lithium manganese oxide having a spinel-type crystal phase, etc. are widely used as a cathode active material to be used in a lithium ion battery. On the other hand, lithiated cobalt oxide having a spinel-type crystal phase as disclosed in Non Patent Literature 1 has been developed in recent years, and is expected as a new cathode active material for a lithium ion battery.

CITATION LIST

Patent Literature

Patent Literature 1: JP 2011-001256 A
Patent Literature 2: JP 2002-289175 A
Patent Literature 3: JP 2016-143539 A

Non Patent Literature

Non Patent Literature 1: Eungje Lee et al., ACS Appl. Mater. Interfaces, 2016, 8, 27720-27729

SUMMARY

Technical Problem

According to findings of the inventors of the present application, it is believed that the volume change of a cathode in charging/discharging can be small when lithiated cobalt oxide having a spinel-type crystal phase as disclosed in Non Patent Literature 1 is employed as a cathode active material of a lithium ion battery since a variation in lattice constant of lithiated cobalt oxide according to insertion/elimination of a lithium ion is small. However, a sufficient discharge capacity as a battery is not always obtained when a lithium ion battery is composed using lithiated cobalt oxide having a spinel-type crystal phase as a cathode active material.

Solution to Problem

The present application discloses, as one means for solving the problem, a cathode active material for a lithium ion battery, the cathode active martial comprising a spinel-type crystal phase including lithium, cobalt, chromium and oxygen, the cathode active material having a composition represented by $LiCo_xCr_yM_zO_{2\pm\delta}$ where M is at least one selected from Al and Mn, and $0.85 \leq x < 1$, $0 < y \leq 0.15$, $0 \leq z$, and $0.85 < x+y+z \leq 1.2$.

A lithium n battery can be composed using the cathode active material of this disclosure. That is, the present application discloses a lithium ion battery comprising: a cathode that contains the cathode active material according to the present disclosure; an anode; and an electrolyte layer that is arranged between the cathode and the anode.

The lithium ion battery of this disclosure may be an all solid-state battery. That is, an electrolyte contained in the electrolyte layer may be a solid electrolyte.

Advantageous Effects

According to new findings of the inventors of the present application, spinel-type lithiated cobalt oxide is doped with a specific amount of chromium like the cathode active material of this disclosure, which makes the capacity of the battery largely increase when the doped lithiated cobalt oxide is employed for a lithium ion battery.

DETAILED DESCRIPTION OF EMBODIMENTS

1. Cathode Active Material

The cathode active material of this disclosure is a cathode active material to be used in a lithium ion battery, and a feature thereof is to comprise a spinel-type crystal phase including lithium, cobalt, chromium and oxygen, the cathode active material having a composition represented by $LiCo_xCr_yM_zO_{2\pm\delta}$ where M is at least one selected from Al and Mn, and $0.85 \leq x < 1$, $0 < y \leq 0.15$, $0 \leq z$, and $0.85 < x+y+z \leq 1.2$.

1.1. Crystal Phase

The cathode active material of this disclosure includes a spinel-type crystal phase including lithium, cobalt, chromium and oxygen. "... includes a spinel-type crystal phase" means that at least a diffraction peak derived from a spinel-type crystal phase is confirmed in X-ray diffraction. For example, diffraction peaks derived from a spinel-type crystal phase are preferably confirmed at positions where $2\theta = 19.8 \pm 0.4°$, $37.3 \pm 0.4°$, $39.0 \pm 0.4°$, $45.3 \pm 0.4°$, $49.7 \pm 0.4°$, $60.1 \pm 0.4°$, $66.17 \pm 0.4°$ and $69.5 \pm 0.4°$ in X-ray diffraction measurement using $CuK\alpha$ as a source which the cathode active material of this disclosure is subjected to. Spinel-type lithiated cobalt oxide is believed to be different from the cathode active material of this disclosure in crystal lattice constant in a spinel-type crystal phase. That is, it is believed that whether or not "a spinel-type crystal phase including lithium, cobalt, chromium and oxygen" is present in the cathode active material can be confirmed by confirming the composition of the cathode active material by means of X-ray diffraction and elementary analysis, and then confirming crystal lattice constants of spinel-type crystal phases by means of X-ray diffraction.

In the cathode active material of this disclosure, a spinel-type crystal phase includes lithium, cobalt, chromium and oxygen. Further, as described later, this spinel-type crystal phase may include at least one of aluminum and manganese. In other words, the cathode active material of the present disclosure can be said to be a material where at least chromium is substituted for a part of elements in spinel-type lithiated cobalt oxide. Whereby, the spinel-type crystal phase is believed to be stabilized.

The cathode active material of the present disclosure includes a specific spinel-type crystal phase as described above. On the other hand, the cathode active material of the present disclosure may include a crystal phase other than a spinel-type crystal phase in addition to a spinel-type crystal phase as long as the problem can be solved. For example, when a composite oxide containing lithium and cobalt is synthesized, a thermally stable layered rock-salt crystal phase may be generated along with a spinel-type crystal phase. A desired effect can be exerted even in this case because of the presence of a spinel-type crystal phase. In this point, the cathode active material of the present disclosure may include a layered rock-salt crystal phase in addition to a spinel-type crystal phase. Diffraction peaks only derived from a spinel-type crystal phase are preferably confirmed in X-ray diffraction measurement that the cathode active material of the present disclosure is subjected to.

1.2. Composition

The cathode active material of the present disclosure has a composition represented by $LiCo_xCr_yM_zO_{2\pm\delta}$ where M is at least one selected from Al and Mn, and $0.85 \le x < 1$, $0 < y \le 0.15$, $0 \le z$, and $0.85 < x+y+z \le 1.2$. According to findings of the inventors of the present application, the capacity as the cathode active material significantly increases when the contents (doping amounts) of chromium and the other metallic elements in spinel-type lithiated cobalt oxide are within specific ranges represented by the composition formula.

In view of further increasing the capacity, x in the composition formula is more preferably $0.85 \le x \le 0.975$, further preferably $0.85 \le x \le 0.95$, and especially preferably $0.87 \le x \le 0.93$; and y therein is more preferably $0.025 \le y \le 0.15$, further preferably $0.05 \le y \le 0.15$, and especially preferably $0.07 \le y \le 0.13$.

In the cathode active material of the present disclosure, Al and Mn are optional, and z in the composition formula may be 0. It is believed that containing Al and Mn makes the spinel-type crystal phase more stable, and further improves the battery properties such as cycle characteristics. In view of this, z in the composition formula is preferably $0.01 \le z$, more preferably $0.05 \le z$, and further preferably $0.1 \le z$. The upper limit of z is not specifically limited, and is properly adjusted as long as the above described conditions are satisfied.

In the cathode active material of the present disclosure, the molar ratio of the other metals (total of Co, Cr and M) to Li is preferably 1 (x+y+z=1). However, even if Li is a little excessive or a little short, the spinet-type crystal phase can be generated/maintained, and a desired effect can be exerted. In this point, as represented by the composition formula, the molar ratio of the other metals to Li has only to be more than 0.85 and no more than 1.2 ($0.85 < x+y+z \le 1.2$). The lower limit is preferably no less than 0.9, and mote preferably no less than 0.95; and the upper limit is preferably no more than 1.1, and more preferably no more than 1.05.

In the cathode active material of the present disclosure, the molar ratio of O to Li (O/Li) is preferably 2 in view of the stoichiometric ratio of spinel-type lithiated cobalt oxide. However, even if oxygen is more excessive than the stoichiometric ratio as a spinel-type crystal phase or even if the spinel-type crystal phase is partially deficient in oxygen, the spinel-type crystal phase can be generated/maintained, and a desired effect can be exerted. In this point, for example, the molar ratio of O to Li (O/Li) is preferably 1.8 to 2.2. Alternatively, in the composition formula, δ is preferably no more than 0.2.

1.3. Shape

The shape and size of the cathode active material of this disclosure are not specifically limited as long as being such that the cathode active material may be employed for a cathode of a lithium ion battery. The cathode active material is preferably in the form of a particle.

1.4. Effect

Spinel-type lithiated cobalt oxide is doped with a specific amount of chromium in the cathode active material of this disclosure, which makes the capacity of the battery largely increase when the doped lithiated cobalt oxide is employed for a lithium ion battery compared with the case where chromium is not included. This is believed to be because the spinel-type crystal phase is stabilized by chromium.

2. Method for Producing Cathode Active Material

For example, the cathode active material of this disclosure can be produced via a first step of mixing a lithium source, a cobalt source, a chromium source, and optionally an aluminum source and/or a manganese source to obtain a mixture; and a second step of heating the mixture to obtain a composite oxide having the spinel-type crystal phase.

2.1. First Step

In the first step, a lithium source, a cobalt source, a chromium source, and optionally an aluminum source and/or a manganese source are mixed to obtain a mixture. Examples of the lithium source include lithium compounds and lithium metal. Examples of lithium compounds include lithium carbonate, lithium oxide, lithium hydroxide, and lithium acetate-. In the case of using a solid phase method, lithium carbonate is preferable. In the case of using a liquid phase method (evaporation to dryness), lithium acetate is preferable. Examples of the cobalt source include cobalt compounds and cobalt metal. Examples of cobalt compounds include cobalt carbonate, cobalt oxide, cobalt hydroxide, and cobalt acetate. In the case of using a solid phase method, cobalt oxide is preferable, and $Co_3O_4$ is more preferable. In the case of using a liquid phase method (evaporation to dryness), cobalt acetate is preferable. Examples of the chromium source include chromium compounds and chromium metal. Examples of chromium compounds include chromium carbonate, chromium oxide, chromium hydroxide, lithium chromate ($Li_2CrO_4$) and chromium acetate. In the case of using a solid phase method, chromium oxide and lithium chromate are preferable. In the case of using a liquid phase method (evaporation to dryness), chromium acetate is preferable. Examples of the aluminum source include aluminum compounds and aluminum metal. Examples of aluminum compounds include aluminum carbonate, aluminum oxide, aluminum hydroxide, and aluminum acetate. In the case of using a solid phase method, aluminum oxide is preferable. In the case of using a liquid phase method (evaporation to dryness), aluminum acetate is preferable. Examples of the manganese source include manganese compounds and manganese metal. Examples of manganese compounds include manganese carbonate, manganese oxide, manganese hydroxide, and manganese acetate. In the case of using a solid phase method, manganese carbonate is preferable. In the case of using a liquid phase method (evaporation to dryness), manganese acetate is preferable. Any compounds described above may be hydrates.

The molar ratio of lithium and the other metals (cobalt, chromium, aluminum, manganese) in the mixture has only to be a ratio that satisfies the above described composition of the cathode active material of the present disclosure.

A mixing way of the lithium source, the cobalt source, etc. is not specifically limited. Any way such as dry mixing of not using solvent, and wet mixing of using solvent can be employed. In the first step, one may dissolve the raw materials to make the mixture (mixed solution) formed of solution, or mix the granular materials with each other to make the mixture of the granular materials. Mixing may be manually carried out using a mortar or the like, or may be mechanically carried out using a ball mill or the like.

Especially in the first step, preferably, the raw materials are dissolved in solvent to obtain a mixed solution, and thereafter the mixed solution is evaporated to dryness, to obtain a solid precursor by a liquid phase method (evaporation to dryness) Examples of solvent used in this case include protic polar solvents such as water and alcohol. The precursor obtained after evaporation to dryness is in a state where lithium and the other metals are uniformly mixed at the atomic level, and is in the form of fine particles and has a large specific area. Such a precursor is heated/calcined in the second step described later, which makes it possible to generate the spinel-type crystal phase for a short time.

2.2. Second Step

In the second step, the mixture obtained in the first step is heated to obtain the composite oxide having the spinel-type crystal phase. Layered rock-salt crystal phases are generated more than spinet-type crystal phases if the heating temperature in the second step is too high since a layered rock-salt crystal phase is thermally more stable than a spinel-type crystal phase generally in a composite oxide of lithium and cobalt. That is, when a desired spinel-type crystal phase is obtained in the mixture, preferably, the heating temperature in the second step is low and the heating time therein is long. Specifically, according to findings of the inventors of the present application, the heating temperature in the second step is 200° C. to 450° C., which makes it easy to obtain a desired spinel-type crystal phase. The lower limit of the heating temperature is more preferably no less than 250° C., and further preferably no less than 280° C., and the upper limit thereof is more preferably no more than 430° C., and further preferably no more than 410° C. The heating in the second step may be adjusted according to the heating temperature. For example, in the case of using a solid phase method, heating for one week or longer can improve the crystallinity of the spinel-type crystal phase. In contrast, in the case of using a liquid phase method (evaporation to dryness), the crystallinity of the spinel-type crystal phase can be improved even if the heating time is no more than 120 hours. The heating atmosphere in the second step has only to be such that the composite oxide can be generated. For example, the heating atmosphere may be an air atmosphere, or an oxygen atmosphere.

3. Lithium Ion Battery

Figure 1:
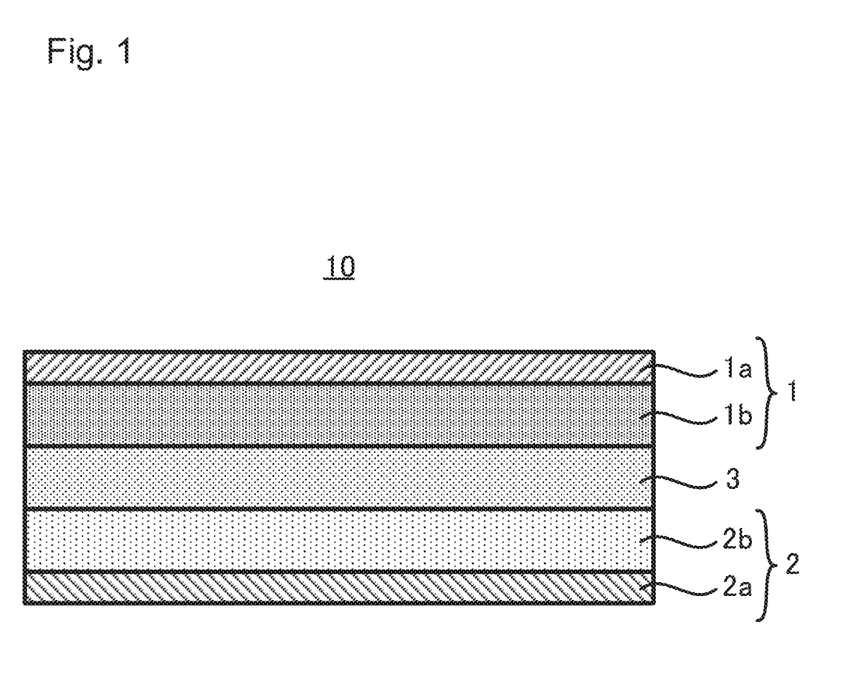
FIG. 1 is a schematic view for illustrating structure of a lithium ion battery 10.

The art of this disclosure also has an aspect of a lithium ion battery. FIG. 1 shows one example of structure of a lithium ion battery of this disclosure. A lithium ion battery 10 shown in FIG. 1 has the feature of including a cathode 1, an anode 2 and an electrolyte 3 that is arranged between the cathode 1 and the anode 2, and the cathode 1 includes the cathode active material of this disclosure.

3.1. Cathode 1

The cathode 1 may have the same structure as conventional one except that the cathode active material of this disclosure is included therein. For example, the cathode 1 includes a cathode current collector 1a, and a cathode active material layer 1b containing the cathode active material of this disclosure. For example, the cathode current collector 1a may be constituted of any metal. The cathode active material layer 1b may optionally contain binder and a conductive additive in addition to the cathode active material. The cathode active material layer 1b may contain a cathode active material other than the cathode active material of the present disclosure in addition to the cathode active material of the present disclosure as long as the problem can be solved. Examples thereof include lithium metal composite oxides having a layered-rock salt crystal phase, and lithium metal phosphoric acids having an olivine crystal phase. The rate of expansion/contraction of the cathode active material of this disclosure according to charge/discharge is low, which is especially advantageous to a solid battery for which interfacial contact between particles is important. In other words, the lithium ion battery of this disclosure is preferably an all solid-state battery. When an all solid-state battery is employed for the lithium ion battery, the cathode active material layer 1b preferably contains a solid electrolyte. As the solid electrolyte, an inorganic solid electrolyte such as an oxide solid electrolyte and a sulfide solid electrolyte is preferable, and a sulfide solid electrolyte is more preferable. Examples of a sulfide solid electrolyte include solid electrolytes containing Li, P and S as constituent elements. Specific examples thereof include $Li_2S$—$P_2S_5$, $Li_2S$—$SiS_2$, $LiI$—$Li_2S$—$SiS_2$, $LiI$—$Si_2S$—$P_2S_5$, $LiI$—$LiBr$—$Li_2S$—$P_2S_5$, $LiI$—$Li_2S$—$P_2S_5$, $LiI$—$Li_2O$—$Li_2O$—$Li_2S$—$P_2S_5LiI$—$Li_2S$—$P_2O_5$, $LiI$—$Li_3PO_4$—$P_2S_5$, and $Li_2S$—$P_2S_5$—$GeS_2$. Among them, specifically, sulfide solid electrolytes containing $Li_2S$—$P/S_5$ are more preferable. Only one solid electrolyte may be used individually, or two or more solid electrolytes may be mixed to be used. When a sulfide solid electrolyte is contained in the cathode 1, in view of suppressing, for example, formation of a high resistance layer over the interface between the cathode active material and the sulfide solid electrolyte, a coating layer such as a layer of lithium niobate may be provided over the surface of the cathode active material. Structure other than the cathode active material is obvious from the technical common sense, and thus more detailed description thereof is omitted.

3.2. Anode 2

Known one as an anode for a lithium ion battery can be employed tier the anode 2. For example, the anode 2 includes an anode current collector 2a, and an anode active material layer 2b containing an anode active material. For example, the anode current collector 2a may be constituted of any metal. A material whose charge-discharge potential of a lithium ion is baser than the cathode active material of this disclosure may be employed for the anode active material. The anode active material layer 2b may optionally contain binder and a conductive additive in addition to the anode active material. When a solid battery is employed for the lithium ion battery, the anode active material layer 2b preferably contains a solid electrolyte as described above. The structure of the anode is obvious from the technical common sense, and thus more detailed description thereof is omitted.

3.3. Electrolyte Layer 3

The electrolyte layer 3 is for conducting a lithium ion between the cathode 1 and the anode 2. Any of an electrolyte solution and a solid electrolyte may be employed for the electrolyte layer 3. When an electrolyte solution is employed, one may arrange a separator between the cathode and the anode, and immerse the separator in the electrolyte solution. On the other hand, when a solid electrolyte is employed, a solid electrolyte layer may be arranged between the cathode and the anode. The solid electrolyte layer contains a solid electrolyte as described above, and optionally binder. As described above, the rate of expansion/contraction of the cathode active material of this disclosure according to charge/discharge is low, which is especially advantageous to a solid battery for which interfacial contact between particles is important. In this point, the electrolyte layer 3 is preferably a solid electrolyte layer containing an inorganic solid electrolyte such as an oxide solid electrolyte and a sulfide solid electrolyte, and more preferably a layer containing a sulfide solid electrolyte. The structure of the electrolyte layer 3 is obvious from the technical common sense, and thus more detailed description thereof is omitted.

3.4. Other Components

The lithium ion battery 10 has only to include the cathode 1, the anode 2 and the electrolyte layer 3. Other than them, terminals, a battery case, etc. are included if necessary. The structures thereof are obvious from the technical common sense, and thus more detailed description thereof is omitted.

3.5. Effect

The cathode active material of this disclosure is employed for the cathode of the lithium ion battery of this disclosure, the cathode has a large capacity, and the volume change of the cathode in charging/discharging is small. The lithium ion battery of this disclosure is preferably used not only as a primary battery but also as a secondary battery.

4. Lithium Ion Battery System

The cathode active material of this disclosure is superior to a conventional cathode active material in stability of the spinel-type crystal phase, and for example, can function as a high voltage type active material. Specifically, according to new findings of the inventors of the present disclosure, doping with chromium brings about a discharge capacity of 4.3 V to 3.5 V. In this point, when the lithium ion battery including the cathode active material of this disclosure is charged/discharged, a charge and discharge control unit preferably controls charge/discharge of the lithium ion battery to make a discharge inception voltage or a charge cutoff voltage high.

Figure 2:
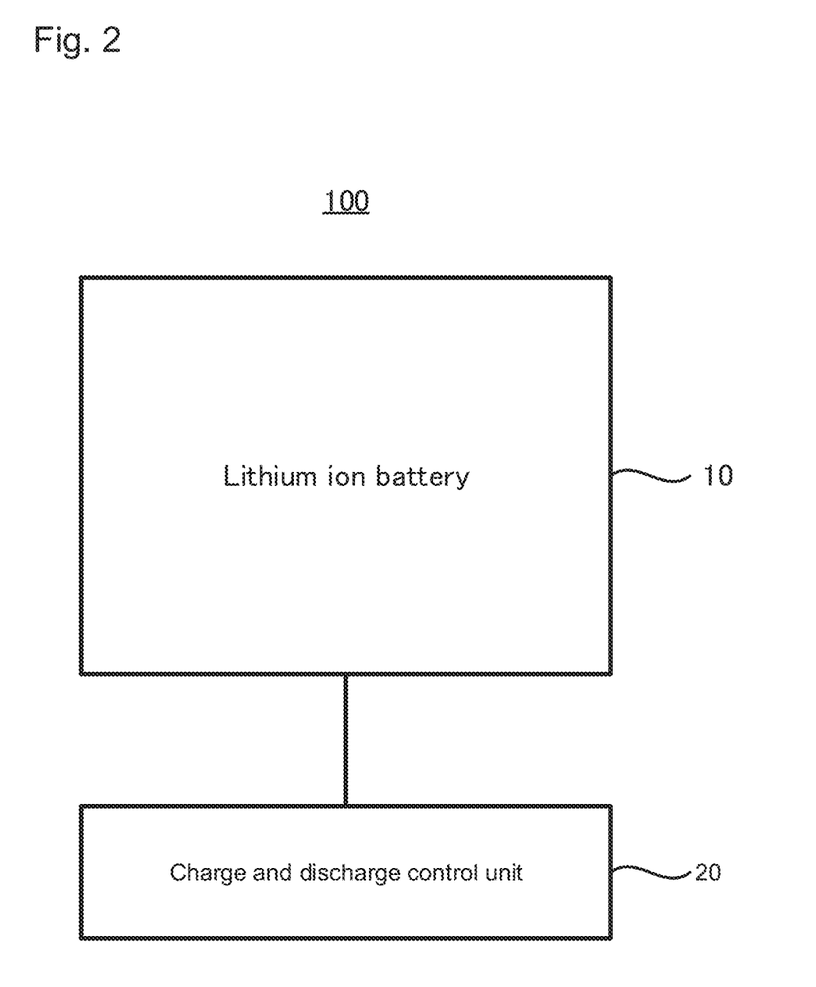
FIG. 2 is a schematic view for illustrating structure of a lithium ion battery system 100.
Figure 3:
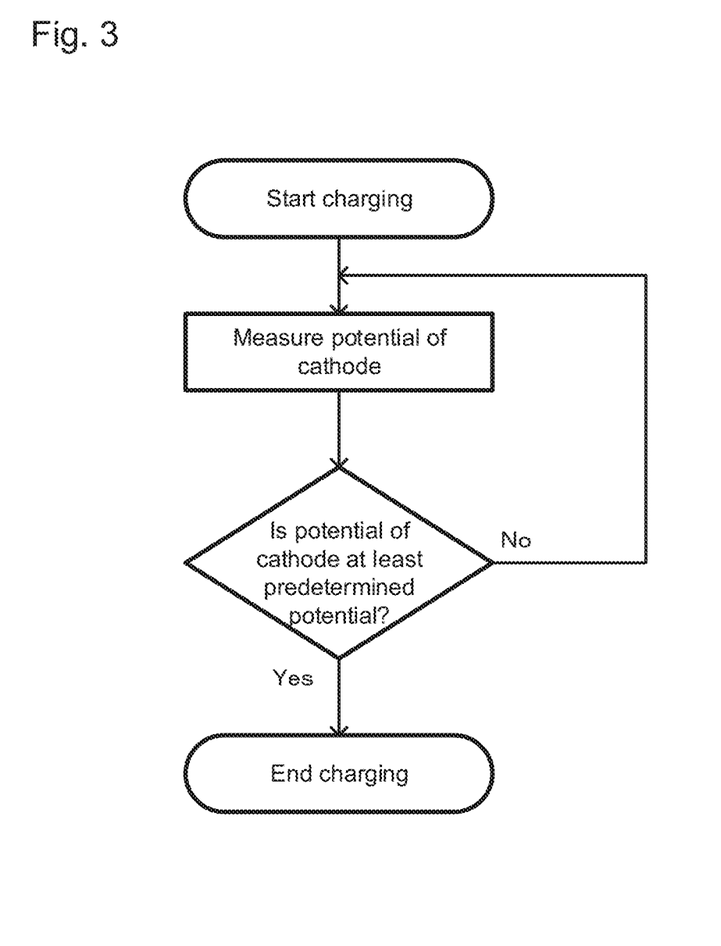
FIG. 3 is a view for illustrating one example of a control flow in the lithium ion battery system 100.

FIG. 2 schematically shows an example of structure of a lithium ion battery system 100. FIG. 3 shows an example of the control flow in the lithium ion battery system 100. As shown in FIGS. 2 and 3, the lithium ion battery system 100 has the feature of including lithium ion battery 10 that includes the cathode active material of this disclosure, and a charge and discharge control unit 20 that controls charge and discharge of the lithium ion battery 10, wherein the charge and discharge control unit 20 makes a discharge inception potential or a charge cutoff potential of the cathode of the lithium ion battery 10 no less than 4.0 V (vs. Li$^+$/Li), which is preferably no less than 4.2 V (vs. Li$^+$/Li) and is more preferably no less than 4.3 V (vs. Li$^+$/Li).

The charge and discharge control unit 20 has only to be able to control charge and discharge of the lithium ion battery 10 as described above. For example, when the lithium ion battery 10 is charged using a power source, one may measure the potential of the cathode of the lithium ion battery 1 successively, continue to charge the battery if the measured potential of the cathode is lower than a predetermined voltage, and stop the supply of electricity from the power source to stop charging the battery if the measured potential of the cathode is no less than a predetermined voltage.

This also applies to the discharge inception potential. That is, in a case where the first discharge is performed after the lithium ion battery 10 is charged, one may measure the potential of the cathode before the first discharge, charge the lithium ion battery 10 without discharge if the measured potential of the cathode is lower than a predetermined voltage, and perform the first discharge if the potential of the cathode is no less than a predetermined voltage due to the charge of the lithium ion battery 10.

When the charge and discharge control unit 20 controls charge and discharge of the lithium ion battery 10, the upper limit of the discharge inception potential or charge cutoff potential of the lithium ion battery 10 is not specifically limited. Too high a potential thereof results in a small effect. Rather, deterioration, decomposition, etc. of members of the battery is concern. In this point, the charge and discharge control unit 20 preferably makes the discharge inception potential or charge cutoff potential of the cathode of the lithium ion battery 10 no more than 5.3 V (vs. Li$^+$/Li), which is more preferably no more than 5.1 V (vs. Li$^+$/Li) and further preferably no more than 5.0 V (vs. Li$^+$/Li).

EXAMPLES

1. Synthesizing Cathode Active Material (Spinel-Type Composite Oxide)

Example 1

Lithium acetate as a lithium source, cobalt acetate as a cobalt source, and chromium acetate as a chromium source were dissolved in an ion exchange water that is a protic polar solvent to obtain a mixed solution. The obtained mixed solution was heated on a hot plate at 250° C. as stirred with a stirrer, and was evaporated to dryness to obtain a solid precursor. The obtained precursor was calcined under an air atmosphere at 300° C. for 120 hours to obtain a cathode active material according to Example 1 ($LiCo_{0.9}Cr_{0.1}O_{2\pm\delta}$).

Example 2

A cathode active material according to Example 2 ($LiCo_{0.9}Cr_{0.1}O_{2\pm\delta}$) was obtained in the same manner as Example 1 except that the calcining temperature of the precursor was 400° C. and the calcining time thereof was 2 hours.

Example 3

A cathode active material according to Example 3 ($LiCo_{0.85}Cr_{0.15}O_{2\pm\delta}$) was obtained in the same manner as Example 1 except that the composition ratio of the raw materials was Li:Co:Cr=1:0.85:0.15, the calcining temperature of the precursor was 400° C., and the calcining time thereof was 2 hours.

Example 4

A cathode active material according to Example 4 ($LiCo_{0.95}Cr_{0.05}O_{2\pm\delta}$) was obtained in the same manner as Example 1 except that the composition ratio of the raw materials was Li:Co:Cr=1:0.95:0.05, the calcining temperature of the precursor was 400° C., and the calcining time thereof was 2 hours.

Example 5

A cathode active material according to Example 5 ($LiCo_{0.975}Cr_{0.025}O_{2\pm\delta}$) was obtained in the same manner as Example 1 except that the composition ratio of the raw materials was Li:Co:Cr=1:0.975:0.025, the calcining temperature of the precursor was 400° C., and the calcining time thereof was 2 hours.

Comparative Example 1

A cathode active material according to Comparative Example 1 ($LiCoO_{2\pm\delta}$) was obtained in the same manner as Example 1 except that the composition ratio of the raw materials was Li:Co:Cr=1:1:0.

Comparative Example 2

A cathode active material according to Comparative Example 2 ($LiCoO_{2\pm\delta}$) was obtained in the same manner as Example 1 except that the composition ratio of the raw materials was Li:Co:Cr=1:1:0, the calcining temperature of the precursor was 400° C., and the calcining time thereof was 2 hours.

Comparative Example 3

A cathode active material according to Comparative Example 3 ($LiCo_{0.9}Ni_{0.1}O_{2\pm\delta}$) was obtained in the same manner as Example 1 except that nickel acetate was used as a nickel source instead of a chromium source, the composition of the raw materials was Li:Co:Ni=1:0.9:0.1, the calcining temperature of the precursor was 400° C., and the calcining time thereof was 2 hours.

Reference Example 1

A cathode active material according to Reference Example 1 ($LiCo_{0.9}Al_{0.1}O_{2\pm\delta}$) was obtained in the same manner as Example 1 except that aluminum acetate was used as an aluminums source instead of a chromium source, the composition of the raw materials was Li:Co:Al=1:0.9: 0.1, the calcining temperature of the precursor was 400° C., and the calcining time thereof was 2 hours.

2. Confirmation of Crystal Phase

Figure 4:
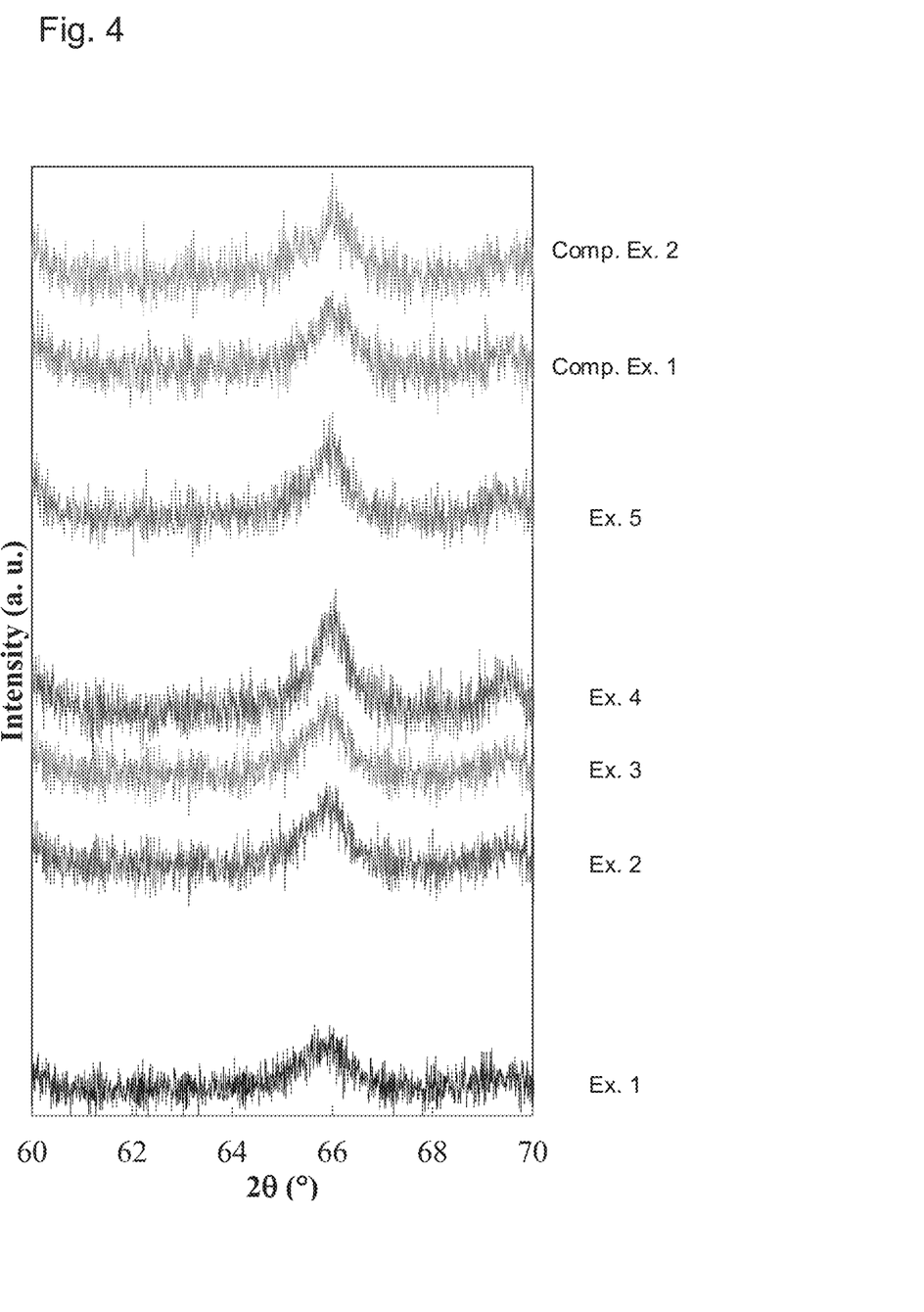
FIG. 4 shows X-ray diffraction peaks of cathode active materials according to Examples 1 to 5 and Comparative Examples 1 and 2.

The cathode active materials of Examples 1 to 5 and Comparative Examples 1 and 2 were subjected to X-ray diffraction measurement using CuKα at a source to confirm diffraction peaks. FIG. 4 shows the results of the X-ray diffraction measurement. As is apparent from the results shown in FIG. 4, diffraction peaks derived from a spinel-type crystal phase were able to be confirmed concerning all Examples 1 to 5 and Comparative Examples 1 and 2.

3. Making Electrode

An obtained cathode active material, a conductive additive, and binder were weighed so as to have a mass ratio of cathode active material:conductive additive:binder=85:10:5, and were subjected to wet mixing along with NMP to obtain slurry. Aluminum foil was coated with the obtained slurry, and was dried at 120° C. overnight to obtain a cathode.

4. Making Lithium Ion Battery

The cathode, an anode (lithium foil), and a F-substituted carbonate-based electrolyte solution as an electrolyte solution were used. A separator was arranged between the cathode and the anode to be sealed up in a coin-type battery together with the electrolyte solution, to obtain a lithium ion battery for evaluation (CR2032 coin cell).

5. Charge-Discharge Test

The made lithium ion battery was subjected to charge-discharge testing under the following conditions to confirm: (1) first discharge capacity after charging of 4.45 V; and (2) coulombic efficiency at the first charge-discharge cycle after the charging of 4.45 V.

CC charging: 0.1 C in current, end at 4.45 V
CC discharging: 0.1 C in current, end at 2.5 V The results are shown in the following Table 1. For reference, FIG. 5 shows the charge-discharge curves of Example 1 and Comparative Example 1, and FIG. 6 shows the charge-discharge curves of Examples 2 to 5.

TABLE 1

| | Composition | Calcining Temp. (° C.) | Calcining time (h) | Discharge capacity (mAh/g) | Coulombic efficiency (%) |
|---|---|---|---|---|---|
| Ex. 1 | $LiCo_{0.9}Cr_{0.1}O_{2\pm\delta}$ | 300 | 120 | 122 | — |
| Ex. 2 | $LiCo_{0.9}Cr_{0.1}O_{2\pm\delta}$ | 400 | 2 | 117 | 64 |
| Ex. 3 | $LiCo_{0.85}Cr_{0.15}O_{2\pm\delta}$ | 400 | 2 | 115 | — |
| Ex. 4 | $LiCo_{0.95}Cr_{0.05}O_{2\pm\delta}$ | 400 | 2 | 111 | — |
| Ex. 5 | $LiCo_{0.975}Cr_{0.025}O_{2\pm\delta}$ | 400 | 2 | 88 | — |
| Comp. Ex. 1 | $LiCoO_{2\pm\delta}$ | 300 | 120 | 82 | — |
| Comp. Ex. 2 | $LiCoO_{2\pm\delta}$ | 400 | 2 | 75 | — |
| Comp. Ex. 3 | $LiCo_{0.9}Ni_{0.1}O_{2\pm\delta}$ | 400 | 2 | 56 | — |
| Ref. Ex. 1 | $LiCo_{0.9}Al_{0.1}O_{2\pm\delta}$ | 400 | 2 | 74 | 86 |

Figure 5:
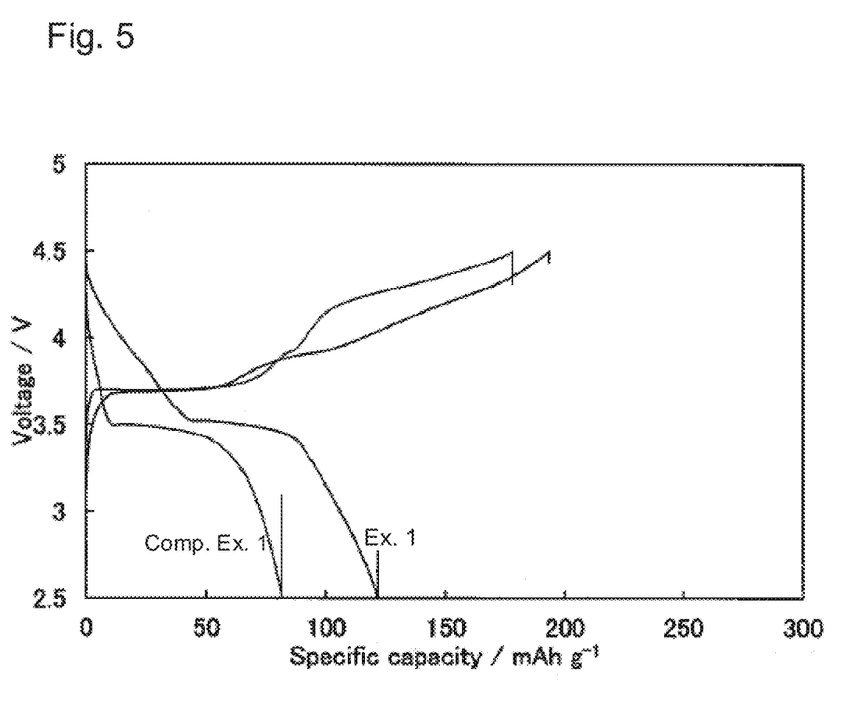
FIG. 5 shows the first charge-discharge curves (4.45 V-2.5 V) of lithium ion batteries using the cathode active materials according to Example 1 and Comparative Example 1.
Figure 6:
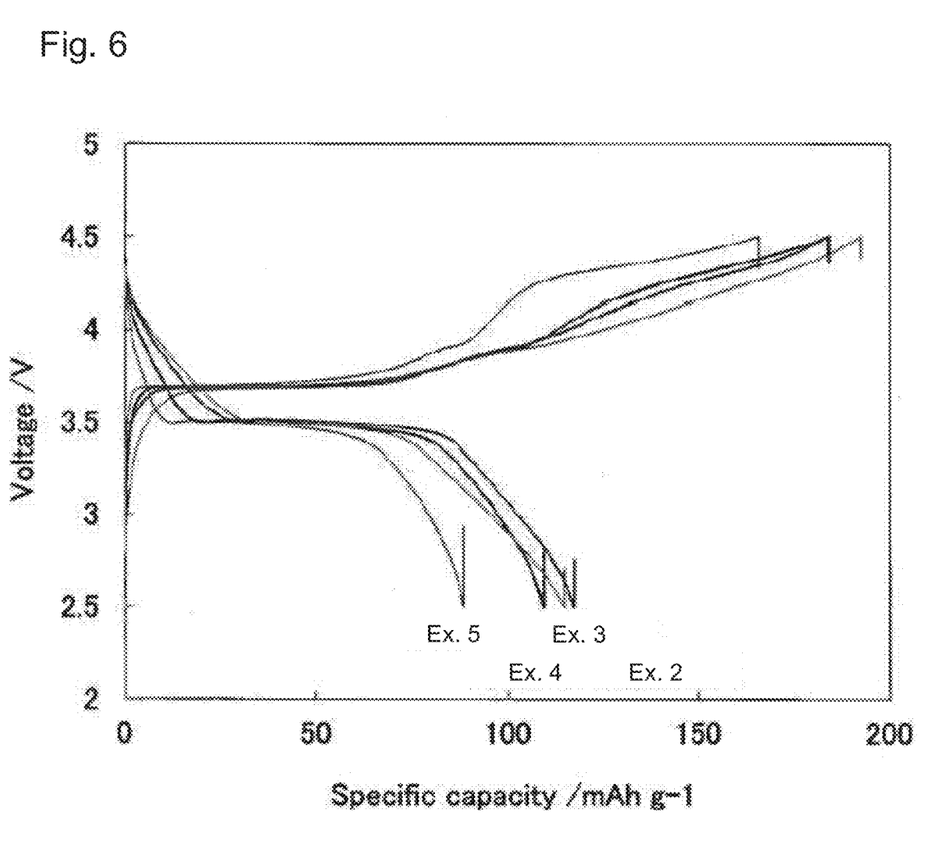
FIG. 6 shows the first charge-discharge curves (4.45 V-2.5 V) of lithium ion batteries using the cathode active materials according to Examples 2 to 5.

As is apparent from the results shown in Table 1 and FIGS. 5 and 6, discharge capacities in Examples 1 to 5 significantly increased more than those in Comparative Examples 1 and 2 and Reference Example 1. This was because doping with chromium brought about a discharge capacity of 4.3 V to 3.5 V as shown in FIGS. 5 and 6. Specifically, the largest discharge capacity was brought about in the case where the content of chromium was 0.1 (Examples 1 and 2).

From the above results, it was found that a better performance can be exerted as a cathode active material of a lithium ion battery in the ease where a specific amount of chromium is substituted for a part of elements in spinel-type lithiated cobalt oxide than the case of using spinel-type lithiated cobalt oxide. It seems that substituting chromium for a part of elements in spinel-type lithiated cobalt oxide stabilized a spinel-type crystal phase, which made it possible to suppress, for example, its dislocation to a layered rock-salt crystal phase. On the other hand, when nickel was substituted for a part of elements in spinel-type lithiated cobalt oxide, the discharge capacity lowered. It was imagined that a spinel-type crystal phase was not be able to be stabilized if doped with nickel.

From the result of reference Example 1, it is believed to be effective to substitute aluminum for a part of elements in spinel-type lithiated cobalt oxide in order to improve coulombic efficiency (cycle characteristics) of a battery. In addition, according to findings of the inventors of the present disclosure, a spinel-type crystal phase can be stabilized and cycle characteristics of a battery can be improved as well by substituting manganese for a part of elements in spinel-type lithiated cobalt oxide (see the earlier Japanese Patent Application No. 2017-237011 by the applicant of the present disclosure). That is, it can be said to be effective to dope spinel-type lithiated cobalt oxide with chromium and further, at least one of aluminum and manganese in view of increasing the capacity of a battery and improving cycle characteristics thereof.

In the Examples, Examples 1 to 5 where the contents of chromium were 0.025 to 0.15 are given. The cathode active material of this disclosure is not restricted to them. As described above, effectiveness of substitution of chromium for a part of elements in spinel-type lithiated cobalt oxide was found in the art of this disclosure. It is believed that even if the content of chromium is less than 0.025, a desired effect can be brought about compared to the case where the content of chromium is 0.

In the Examples, the molar ratio of lithium and the other metals was adjusted to be 1. The molar ratio of the other metals to lithium is not limited to this as long as a spinel-type crystal phase can be obtained. According to findings of the inventors of the present disclosure, a sufficient effect can be exerted if the molar ratio of the other metals to Li is more than 0.85 and no more than 1.2.

INDUSTRIAL APPLICABILITY

A lithium ion battery using the cathode active material according to this disclosure can be used in a wide range of power sources such as a small-sized power source for portable devices and an onboard large-sized power source.

REFERENCE SIGNS LIST

1 cathode
2 anode
3 electrolyte layer
10 lithium ion battery

What is claimed is:

1. A cathode active material for a lithium ion battery, the cathode active martial comprising a spinel-type crystal phase including lithium, cobalt, chromium and oxygen, the cathode active material having a composition represented by $LiCo_xCr_yM_zO_{2\pm\delta}$ where M is at least one selected from Al and Mn, and $0.85 \leq x < 1$, $0 < y \leq 0.15$, $0 \leq z$, and $0.85 < x+y+z \leq 1.2$, and the cathode active material is configured to only having diffraction peaks derived from the spinel-type crystal phase as confirmed in X-ray diffraction measurement.

2. A lithium ion battery comprising:
   a cathode that contains the cathode active material according to claim 1;
   an anode; and
   an electrolyte layer that is arranged between the cathode and the anode.

3. The lithium ion battery according to claim 2, the lithium ion battery being an all solid-state battery.

* * * * *